United States Patent Office.

EBEN N. HORSFORD, OF CAMBRIDGE, MASSACHUSETTS.

Letters Patent No. 75,272, dated March 10, 1868.

---

IMPROVED MANUFACTURE OF ACID PHOSPHATES TO BE USED IN FOOD.

---

*The Schedule referred to in these Letters Patent and making part of the same.*

---

TO ALL WHOM IT MAY CONCERN:

Be it known that I, EBEN N. HORSFORD, of the city of Cambridge, in the county of Middlesex, and State of Massachusetts, have invented a new and useful Improvement in the Introduction of Phosphates into Food; and I do hereby declare that the following is a full and exact description thereof.

My invention consists in the use of acid phosphate of lime, magnesia, or alkali, as a condiment, in liquid form, either by itself or as a substitute for vinegar, or an ingredient in a beverage or sauce, or for other culinary or sanitary purposes, where it is desirable to employ an acid in liquid form.

The importance of phosphates to the animal economy, to be supplied through the food, has long been recognized. I have found the advantage to the health, of using the liquid monobasic acid phosphate, when employed in aid of digestion and assimilation, to be of the most marked character. Dyspepsia of certain forms is relieved by taking with the meals a teaspoonful of the liquid acid phosphate, of specific gravity 1.17, in a glass of water. It may be used as vinegar, when I dilute the acid of the above strength with five times its volume of water, for ordinary household consumption. It may be employed as an ingredient in beverages, taking the place of lemon-juice, on long voyages, to prevent the ill effects arising from the too long use of salt provisions, by supplying the phosphates of which the meats have been deprived; or it may be used as an ingredient in producing an effervescing draught, or in the composition of sauces; or, when mixed with flour, as a substitute for hydrochloric acid, in the process of Thompson, for decomposing bicarbonate of soda, in making bread light without the use of ferment.

The acid phosphate I employ is generally a compound of one atom of lime with one atom of phosphoric acid, with a small addition of free phosphoric acid, and is prepared as follows:

I add to tribasic phosphate of lime, sulphuric acid, in the proportions described in my patents for producing acid phosphate of lime, for use in preparing self-raising flour, being about fourteen hundred parts of burned bones to one thousand parts of oil of vitriol. The sulphuric acid withdraws a little more than two atoms of lime from the phosphate, leaving monobasic phosphate of lime and a small proportion of free phosphoric acid in solution, but mixed with gypsum. The solution is separated from the gypsum by leaching. I take the liquor thus separated as long as it runs of a specific gravity that will average 1.17. I do not propose to limit myself to this strength, nor to these proportions, but it is convenient to have a constant strength, and I have found this strength and the above proportions convenient for production in a large way.

This liquid may be kept in glass or stoneware. In this form it is ready for use, or to be diluted to fit it for use where less strength is desired. Diluted with twenty times its volume of water, it may be employed to remove tartar from teeth, without injury to the enamel. It operates both as a very weak acid, and specifically to destroy traces of food lodged in the insterstices between the teeth.

In suiting the acid phosphate of lime to the wants above alluded to, the constant specific gravity of the liquid will be a guide. The acid phosphate of lime may be substantially replaced by the corresponding compounds of magnesia and potassa or soda, produced by the usual well-known chemical methods.

What I claim, and desire to secure by Letters Patent of the United States, is—

The manufacture of liquid acid phosphate of lime, for use as a condiment or article of diet, or ingredient to be employed in beverages or food, substantially as and for the purposes herein set forth.

E. N. HORSFORD.

Witnesses:
   A. POLLOK,
   EDM. F. BROWN.